United States Patent [19]

Kondo

[11] Patent Number: 5,538,773
[45] Date of Patent: Jul. 23, 1996

[54] OPTICAL RECORDING MEDIUM AND THE REPRODUCING APPARATUS FOR THE OPTICAL RECORDING MEDIUM

[75] Inventor: Tetsuya Kondo, Yokohama, Japan

[73] Assignee: Victor Company of Japan, Ltd., Yokohama, Japan

[21] Appl. No.: 267,167

[22] Filed: Jun. 28, 1994

[30] Foreign Application Priority Data

Jun. 30, 1993 [JP] Japan .................................. 5-187609

[51] Int. Cl.$^6$ ........................................ B32B 3/00
[52] U.S. Cl. ........................ 428/64.1; 428/64.2; 428/64.4; 428/913; 430/270.1; 430/495.1; 430/945; 369/272; 369/273; 369/275.1; 369/275.4; 369/275.5; 369/277
[58] Field of Search ........................... 428/64, 65, 913, 428/64.1, 64.2, 64.4; 369/272, 273, 275.1, 275.4, 275.5, 277; 430/270, 495, 945

[56] References Cited

U.S. PATENT DOCUMENTS 5,274,623 12/1993 Usami .................................. 369/275.1

OTHER PUBLICATIONS

IEC 908:1987 International Electrotechnical Commission, 1st edition and Amendment I.

*Primary Examiner*—Patrick J. Ryan
*Assistant Examiner*—Elizabeth Evans
*Attorney, Agent, or Firm*—Michael N. Meller

[57] ABSTRACT

The present invention discloses an optical recording medium having copy protection measures, production method thereof and a reproducing apparatus therefor. The optical disc comprises a data recording area recorded with ciphered digital signals and a cipher key information recording area provided other than the data recording area in the optical recording medium for recording cipher key information to determine a deciphering method of the ciphered digital signals. The cipher key information is provided along a peripheral edge surface which is outside the surface of the optical recording medium in a serrated pattern, perpendicular to the surface having the recording layer. The serrated pattern is formed by an injection molding machine using a metal mold having an injection molding member provided with a serrated negative pattern in accordance with the recording cipher key information to be recorded. The ciphered digital signals and the cipher key information are respectively read out from the optical recording medium by a reproducing device and the ciphered digital signals obtained are deciphered by a deciphering device using the cipher key information obtained.

3 Claims, 2 Drawing Sheets

OPTICAL RECORDING MEDIUM AND THE REPRODUCING APPARATUS FOR THE OPTICAL RECORDING MEDIUM

BACKGROUND OF THE INVENTION

1. Field of the Invention

The present invention relates to an optical recording medium and a reproducing apparatus, in particular, relates to a copy-protection type optical recording medium and the reproducing apparatus for the optical recording medium.

2. Description of the Related Art

Presently, there are widely used a read-only-type optical disc such as a CD (Compact Disc) for recording music information or a CD-ROM (Read-Only-Memory) for recording information such as program software and a data base, an additional-writable-type disc such as a write once (WO) disc on which information can be written only once, and an erasable-type disc such as a magneto-optical (MO) disc on which information can be repeatedly written. As well known, it can be easily performed to read out the data recorded on the read-only-type optical disc and to record the data obtained therefrom, for instance, on another additional-writable-type optical disc. Presently, there is rarely considered a measure to protect the music information, the program software and the data base recorded on the read-only-type optical disc from being copied. Therefore, an illegal copying can be easily performed on the original CD and CD-ROM.

In recording a precious software on the read-only-type optical disc, however, there has been taken a measure to protect the precious software against the illegal copying by employing a hardware key or a special data disc referred to as a key disc for the protection.

In the above method, however, it requires the hardware key or the key disc to protect the software from being illegally copied in addition to the recording medium for recording the software, which poses an increase of cost of the software and gives users a potential problem that the recording medium is impossible to be used when breakage of the hardware key, the key disc or missing of the key disc occurs.

SUMMARY OF THE INVENTION

Accordingly, a general object of the present invention is to provide a novel and useful optical disc having a copy protection function for software or music recorded thereon and a reproducing apparatus for the optical disc without increasing of cost.

A more specific object of the present invention is to provide an optical recording medium comprising a data recording area recorded with ciphered digital signals, and a cipher key information recording area provided other than the data recording area in the optical recording medium and recorded with cipher key information which determines a deciphering method of the ciphered digital signals recorded on the data recording area, the cipher key information being provided along the outside surface of the optical recording medium perpendicular to the surface having the recording layer (hereinafter referred to as "the peripheral edge surface").

Another specific object of the present invention is to provide a method for producing an optical recording medium comprising the steps of, forming ciphered digital signals in a data recording area in the optical recording medium, and forming cipher key information in a serrated pattern at a peripheral edge surface of the optical recording medium by molding the recording medium using the an injection molding machine equipped with a metal mold having an injection molding member provided with a serrated negative pattern in accordance with the cipher key information to be recorded.

Another specific object of the present invention is to provide a reproducing apparatus for reading out an original data from an optical disc having a data recording area recorded with ciphered digital signals and a cipher key information area recorded with cipher key information, the cipher key information being formed at a peripheral edge surface of the optical disc, the peripheral edge surface being formed other than the data recording area of the optical disc, the reproducing apparatus comprising, data reading means for reading out the ciphered digital signals from the data recording area, a cipher key information reading means provided so as to face the peripheral edge surface of the optical disc for reading out the cipher key information, deciphering means for deciphering the ciphered digital signals and restoring the original data by using the cipher key information obtained with the cipher key information reading means.

DETAILED DESCRIPTION OF THE PREFERRED EMBODIMENTS

Figure 1:
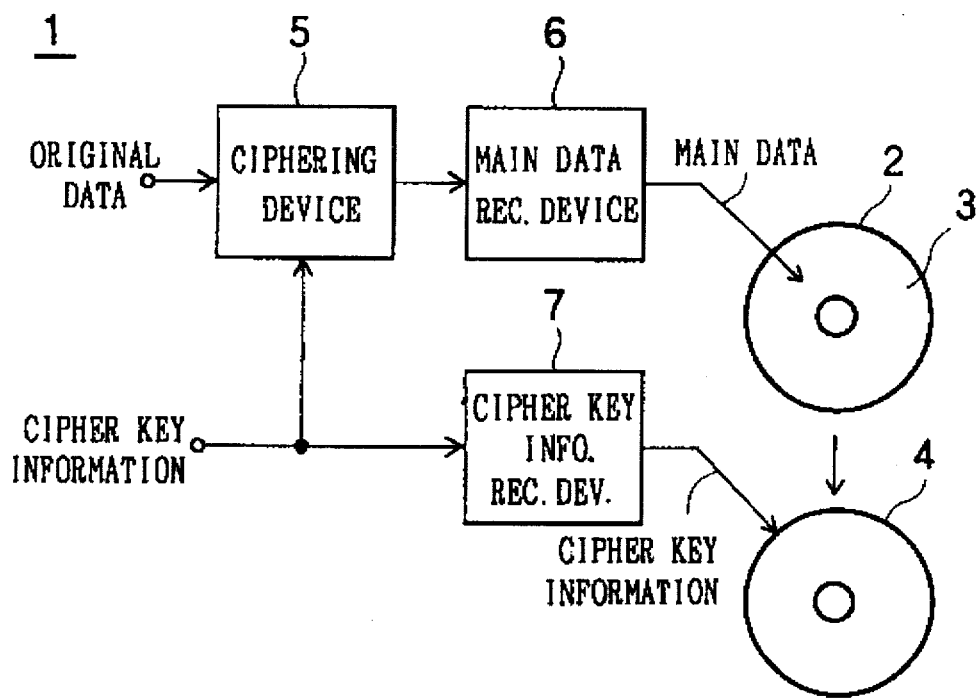
FIG. 1 is a schematic diagram of a recording apparatus used for recording information on an optical disc of an embodiment of the present invention.

At first, a description is given to a signal recording method of an optical disc of the present invention together with a recording apparatus shown in FIG. 1

FIG. 1 is a schematic diagram of a recording apparatus used for recording information on an optical disc of an embodiment of the present invention.

In FIG. 1 showing the recording apparatus 1, a numeral 2 designates an optical disc, and 3 a data recording area defined within an area where an optical head (not shown) of the recording apparatus 1 can scan. The data such as the music information and the software are to be recorded on the data recording area. Further, a non-data recording area 4 is defined in an area other than the data recording area 3 in the optical disc 2, i.e., areas where the optical head can not scan, for instance, a surface opposite to the data recording area 3 where a label is provided, that are an area defined from a center hole of the optical disc 2 to the data recording area 3 and an area defined from the data recording area 3 to a periphery of the optical disc 2.

A numeral 5 designates a ciphering device for generating ciphered signals from original data by cipher key information, 6 main data recording device for recording the ciphered signals on the data recording area 3, and 7 a cipher key information recording device for recording the cipher key information on the non-data recording area 4 of the optical disc 2.

Next, a description is given of an operation of the recording apparatus 1.

When the original data such as digital signals used in the conventional optical disc regarding the music information and the program software are inputted to the ciphering device 5, the original data are ciphered by the ciphering device 5.

As the ciphering method of the original data, for example, there is considered a method that after the original data are divided into a plurality of groups each containing several bits, a few bits within each of groups are shifted in a right-hand direction or in a left-hand direction. In the above ciphering method, ciphering rules for ciphering the original data into the ciphered data or main data are preliminarily given to the ciphering device 5, and quantitative information such as a number of groups to be divided and a number of bits to be shifted are given by cipher key information. As mentioned above, in the ciphering device 5, the original data are ciphered into the main data on the basis of the ciphering rules by using the cipher key information. The main data obtained are inputted to the main data recording device 6, and are recorded on the data recording area 3 of the optical disc 2 by the main data recording device 6 in the conventional manner.

Further, the cipher key information is inputted to the cipher key information recording device 7, and is recorded on the non-data recording area 4 of the optical disc 2 thereby. A specific embodiment of the cipher key information recording device 7 is described hereinafter.

Thus, it is possible to obtain the optical disc 2 carrying the cipher key information and the main data generated based on the ciphering rules by using the cipher key information.

Figure 2:
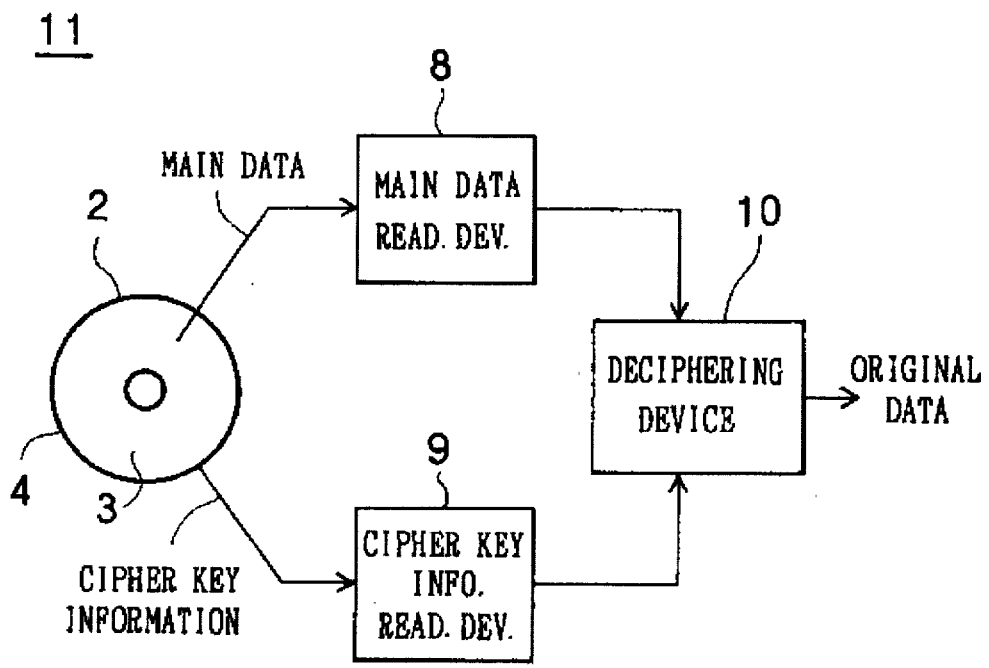
FIG. 2 is a schematic diagram of a reproducing apparatus of the present invention.

In reproduction, the main data together with the cipher key information are reproduced from the optical disc 2 by a reproducing apparatus 11 as shown in FIG. 2, and the main data are deciphered by using the cipher information, otherwise, the original data can not be acquired without the cipher key information.

Needless to say, the more complicated the ciphering method becomes, the more difficult the deciphering method becomes, this enhances a copy protection effect of the optical disc 2.

Further, as seen from the aforementioned description, the ciphering method of the present invention is determined on the basis of the ciphering rules by using the cipher key information, thus in the light of copy protection, it is impossible to acquire the content of the original data from the copied disc unless the cipher key information is copied to be readable together with the main data.

The signal recording method of the optical disc 2 by the aforementioned recording apparatus 1, can be applied to a process of producing the recording master of the CD or CD-ROM and an injection molding process of the optical disc.

The optical disc 2 of the present invention can be produced in the same process as the conventional one by using the molding master.

Next, a description is given to a reproducing apparatus of the present invention.

FIG. 2 is a schematic diagram of a reproducing apparatus of the present invention.

Referring to FIG. 2, a numeral 11 designates a reproducing apparatus for reproducing the original data or information from the optical disc 2. The reproducing apparatus 11 comprises a main data reading device 8 for reading out the main data from the data recording area 3 of the optical disc 2, a cipher key information reading device 9 for reading out the cipher key information from the non-data recording area 4 and a deciphering device 10 for deciphering the main data on the basis of a deciphering rules by using the cipher key information.

At first, the cipher key information is read out from the optical disc 2 by the cipher key information reading device 9 and is inputted to the deciphering device 10, in which a deciphering method is determined by using the cipher key information. In the deciphering device 10, the deciphering rules for deciphering the main data ciphered are preliminarily established.

Specifically, after a series of the main data consisting of digital bits is divided into an "N" number of groups, a specific "M" number of bits in each of the groups is displaced in a predetermined direction "C", left or light, for instance, from the left-hand direction to the right-hand direction or from the right-hand direction to the left-hand direction within each of the groups where vacant bit slots caused by the bit displacement may be filled with predetermined values (or by rules) of bits or, as an alternative, with the bits displaced out of the group caused by the bit displacement. The deciphering method is specifically determined on the basis of the deciphering rules by using the cipher key information, i.e., "N"=4, "M"=1 and "C"=right.

Thus, for example, from a series of main data ciphered, /1011/1001/1100/0011/, a series of original data, /1101/1100/0110/1001/, is to be obtained by applying the above deciphering method.

Next, after the deciphering method is determined by the deciphering device 10, the main data recorded on the data recorded area 3 are read out by the main data reading device 8, and are inputted to the deciphering device 10, in which the original data are restored and outputted by causing the main data to be deciphered according to the deciphering method.

As mentioned in the foregoing, the original data can not be generated from the illegally copied optical disc carrying only the main data without the cipher key information recorded in a predetermined position of the optical disc 2.

On the other hand, it is essential to protect the cipher key information from being easily copied by users. Further, it is important to determine the recording position of the cipher key information on the optical disc 2 in view of durability.

Thus, a description is given to an embodiment of the optical disc and the reproducing apparatus.

Figure 3:
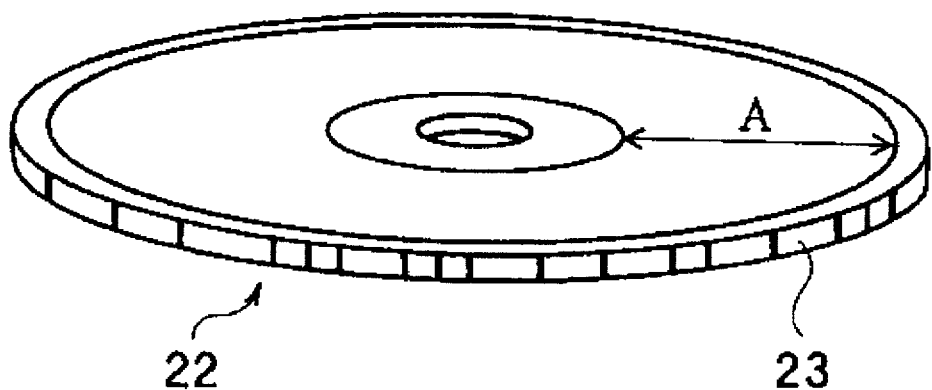
FIG. 3 is a perspective view showing the optical disc of an embodiment of the present invention.

FIG. 3 is a perspective view showing an optical disc of an embodiment of the present invention.

Referring to FIG. 3, a numeral 21 designates an optical disc such as a CD or a CD-ROM. The main data are recorded in an area "A" where an optical head (not shown) of the reproducing apparatus can scan, and bar-codes 22 based on the cipher key information are recorded along a peripheral edge surface 23 of the optical disc 21 where the optical head can not scan. The bar-codes 22 are formed in a serrated pattern having a plurality of notches and ridges in accordance with the cipher key information.

As well known, a diameter of the CD (the optical disc 21) is specified as 120 mm±0.3 mm according to the JIS (Japan Industrial Standard) S8605-1993. Thus, the bar-codes 22 of the present invention are formed in the serrated pattern along the peripheral edge surface 23 so that a distance from a center of the optical disc 2 to an intermediate position of a depth of the notch or of a height of the ridge is determined to be 60 mm, and a difference value of a height from a bottom of the notch to a top of the ridge is to be less than 300 μm. The shapes of the notch and ridge are not limited to a specific shape as long as the cipher key information reading device 9 can read out the bar-codes 22, for instance, a "U" shaped notch or a "V" shaped notch can be employed.

Next, a description is given of a production method of the optical disc 21 having the serrated pattern along the peripheral edge surface 23 thereof, which is an embodiment of the present invention.

Figure 4:
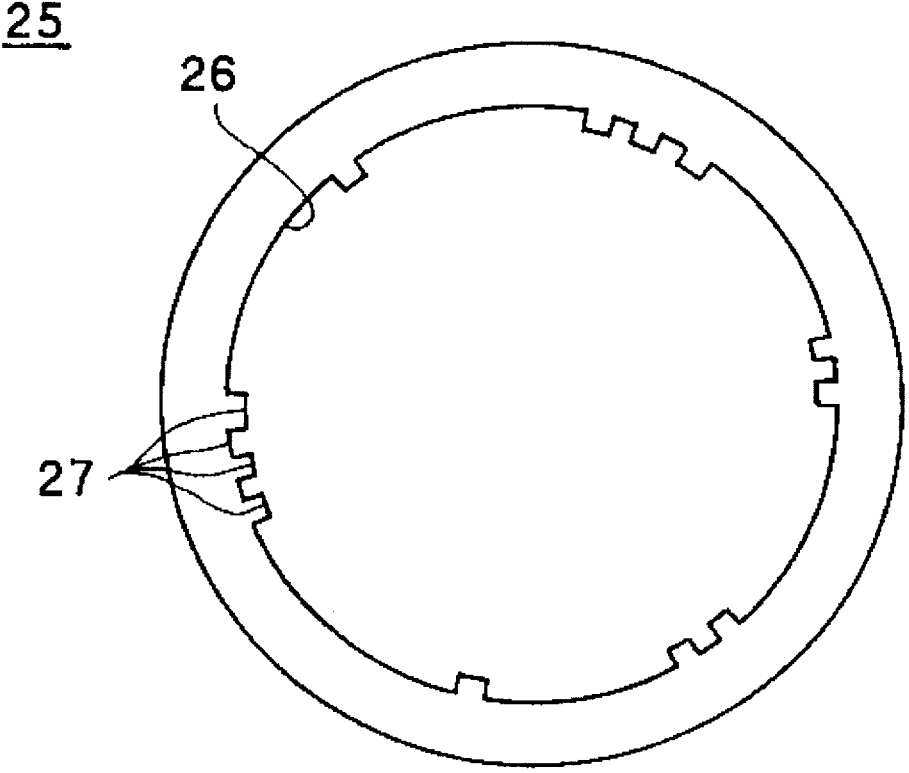
FIG. 4 is a plan view showing a peripheral ring used for an injection metal mold.

FIG. 4 is a plan view showing a peripheral ring used for an injection metal mold.

At first, the main data ciphered are generated from the original data by using the ciphering method as described in the foregoing. A stamper (not shown) for the optical disc 21 is made by masterring the main data using the main data recording device 6. This stamper is installed on a surface of a metal mold for an injection molding. A serrated negative pattern to be formed on the peripheral edge surface 23 of the optical disc 21, is formed on a inner rim of a peripheral ring 25 shown in FIG. 4 of the metal mold. In detail, along an internal peripheral edge surface 26 of the peripheral ring 25, a plurality of ridges 27 having flat tops are formed in accordance with the cipher key information. For example, this peripheral ring 25 is made of a stainless steel disc with a thickness of 1.12 mm and a diameter of 150 mm so as to have an opening with an internal diameter of 120 mm around which the ridges 27 are formed in accordance with the cipher key information by causing the stainless steel disc to be cut by, for example, a laser beam. Thus, a serrated negative pattern is formed along the internal peripheral edge surface 26 so that each of heights of the ridges 27 is to be less than or equal to 300 μm as mentioned in the foregoing.

The above peripheral ring 25 is installed to the metal mold (not shown) together with the stamper in the metal mold. Thus, the optical disc 21 is molded in a conventional manner by a injection molding machine using the metal mold. Further, in the reproducing apparatus 11 for reproducing the optical disc 21, the cipher key information reading device 9 is constructed by using a capacitance sensor or a reflection type photo-sensor employing a photo-diode and a photo-detector. Thus, the cipher key information can be read out from the bar-codes 22 of the serrated pattern formed along the peripheral edge surface 23 of the optical disc 21 by detecting changes of capacitance or changes of reflected light intensity due to the serrated pattern thereof. The cipher key information reading device 9 is disposed to face the peripheral edge surface 23 of the optical disc 21.

The deciphering method is determined in the deciphering device 10 by using the cipher key information read out from the optical disc 21, and the original data are restored by causing the main data read out by the main data reading device 8 to be deciphered according to the above deciphering method in the deciphering device 10.

According to the optical disc 21 of the present invention, the main data ciphered from the original data are recorded in the data recording area 3 of the optical disc 21 and the cipher key information for deciphering the main data is recorded on the peripheral edge surface 23 of the optical disc 21, thus the optical disc 21 can be protected from manufacturing illegal copies by molding. Specifically, the main data may be copied to other optical discs to manufacture by using the conventional reproducing apparatus and mastering and injection molding facilities, however, it is impossible to copy the cipher key information on to the discs to be manufactured without having the peripheral ring 25 carrying the cipher key information in the serrated negative pattern, this protects the original data from being copied because the main data can not be deciphered without the cipher key information.

Further, the cipher key information has less information as mentioned in the foregoing and is recorded along the overall peripheral edge surface 23 of the optical disc 21, which does not require a minute or precise bar-code structure for displaying the cipher key information. Thus, the cipher key information reading device 9 can be realized by employing a simple structure. Further, the cipher key information reading device 9 can be disposed so as to face the peripheral edge surface 23 of the optical disc 21, which enables to realize the reproducing apparatus 11 having a small thickness. Further, the capacitance (static) sensor or a magnetic sensor can be employed as the cipher key information reading device 9, which also enables to realize the reproducing apparatus 11 having a small thickness and the cipher key information reading device 9 having a simple structure due to their high sensitivities.

Further, as the cipher key information recorded on the peripheral edge surface 23 of the optical disc 21 is formed in the serrated pattern, it is impossible to easily copy the cipher key information therefrom, which can protect the original data from being illegally copied.

Further, a conventional CD injection molding machine can be used by employing the metal mold having the peripheral ring 25 provided with the serrated negative pattern along the internal peripheral edge surface 26 thereof. In other words, it does not require a special production process to form such serrated negative pattern on the peripheral edge surface 23 of the optical disc 21, which enables to suppress an increase of a cost of the optical disc 21 to the minimum.

While the presently preferred embodiment of the present invention has been shown and described, it is to be understood that various changes and modifications may be made therefrom. For instance, after the optical disc is molded by the injection molding process and a reflecting film is formed by an evaporation method on the surface of the disc, it is possible to obtain a pattern of bar-codes 22 on the peripheral edge surface 23 of the optical disc 2 by printing it in ink or by inscribing a plurality of minute notches and ridges by using a laser beam, in accordance with the cipher key information.

In reading out the above cipher key information recorded in ink or with the serrated pattern from the optical disc 21, the reflecting type sensor can be used as the cipher key information reading device 9 of the reproducing apparatus 11.

Alternatively, magnetic-ink and the magnetic sensor can be employed instead of the above ink and the reflecting type sensor as the cipher key information reading device 9. Further, these cipher key information recording methods mentioned above may be optionally combined.

According to the optical recording medium of the present invention, the cipher key information is recorded along the overall peripheral edge surface of the optical disc, thus, it requires neither another key disc for recording and reproducing the cipher key information, nor a minute or precise recording pattern, which enables to provide an optical recording medium for protecting the original data from illegal copying, suppressing an increase of cost of the optical recording medium to the minimum. Further, it enables the cipher key information reading device of the reproducing apparatus to employ a simple circuit structure.

Moreover, the cipher key information is recorded on the peripheral edge surface thereof in the serrated pattern having a plurality of notches and ridges so that the difference of the height from each of bottoms of the notch to each of tops of the ridges of the serrated pattern is to be less than or equal to 300 μm, which enables the cipher key information to be protected form being copied, and enables the serrated pattern of the optical disc to be formed satisfying the CD standard.

Moreover, according to the production method of the optical recording medium of the present invention, the serrated pattern is formed by an injection molding machine using a metal mold having an injection molding member provided with the serrated negative pattern in accordance with the recording cipher key information, which enables to use the conventional injection molding machine, thus, an increase of cost of the optical recording medium is suppressed to the minimum.

Moreover, according to the reproducing apparatus for the optical recording medium of the present invention, the reproducing apparatus comprises a data reading device for reading the ciphered digital signals from the data recording area, a cipher key information reading means provided so as to face the peripheral edge surface of the optical disc for reading the cipher key information, and deciphering means for deciphering the ciphered digital signals by using the cipher key information obtained with the cipher key information reading means, thus, an illegally manufactured disc such as having no cipher key information is prevented from being reproduced properly.

What is claimed is:

1. An optical recording medium comprising:
   a data recording area recorded with ciphered digital signals; and
   a cipher key information recording area provided other than the data recording area in the optical recording medium and recorded with cipher key information which determines a deciphering method of the ciphered digital signals recorded on the data recording area, the cipher key information being provided along outside surface of the medium perpendicular to the surface having the recording layer of the optical recording medium.

2. An optical recording medium as claimed in claim 1, wherein the cipher key information is formed in a serrated pattern having a plurality of notches and ridges, and a difference of a height from each of bottoms of the notches to each of tops of the ridges is limited less than or equal to 300 μm.

3. A reproducing apparatus for reading out an original data from an optical disc having a data recording area recorded with ciphered digital signals and a cipher key information area recorded with cipher key information, the cipher key information being formed at outside surface of the medium perpendicular to the surface having the recording layer of the optical disc, outside surface of the medium perpendicular to the surface having the recording layer being formed other than the data recording area of the optical disc, the reproducing apparatus comprising:

data reading means for reading out the ciphered digital signals from the data recording area;

a cipher key information reading means provided so as to face outside surface of the medium perpendicular to the surface having the recording layer of the optical disc for reading out the cipher key information;

deciphering means for deciphering the ciphered digital signals and restoring the original data by using the cipher key information obtained with the cipher key information reading means.

* * * * *